(12) United States Patent
Proctor

(10) Patent No.: US 6,490,593 B2
(45) Date of Patent: *Dec. 3, 2002

(54) APPARATUS AND METHOD FOR COMPOUND ON-LINE ANALYTICAL PROCESSING IN DATABASES

(75) Inventor: Anthony Charles Proctor, Stowmarket (GB)

(73) Assignee: Crystal Decisions, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/894,212

(22) Filed: Jun. 27, 2001

(65) Prior Publication Data

US 2001/0047364 A1 Nov. 29, 2001

Related U.S. Application Data

(63) Continuation of application No. 09/087,680, filed on May 29, 1998, now Pat. No. 6,289,352.

(51) Int. Cl.7 .............................. G06F 17/30
(52) U.S. Cl. .............................. 707/102; 707/2; 707/3; 707/10; 707/100
(58) Field of Search .............................. 707/102, 100, 707/2, 3, 10

(56) References Cited

U.S. PATENT DOCUMENTS

| | | | |
|---|---|---|---|
| 5,905,985 A | | 5/1999 | Malloy et al. |
| 5,926,818 A | | 7/1999 | Malloy et al. |
| 5,926,820 A | * | 7/1999 | Agrawal et al. ............ 707/200 |
| 5,940,818 A | | 8/1999 | Malloy et al. |
| 5,943,668 A | | 8/1999 | Malloy et al. |
| 5,943,677 A | * | 8/1999 | Hicks ......................... 707/205 |
| 5,978,788 A | | 11/1999 | Castelli et al. |
| 5,978,796 A | | 11/1999 | Malloy et al. |
| 5,983,215 A | | 11/1999 | Ross et al. |
| 5,983,232 A | | 11/1999 | Zhang |
| 6,003,036 A | * | 12/1999 | Martin ........................ 707/100 |
| 6,006,216 A | | 12/1999 | Griffin et al. |
| 6,073,140 A | | 6/2000 | Morgan et al. |
| 6,094,651 A | | 7/2000 | Agrawal et al. |
| 6,122,628 A | * | 9/2000 | Castelli et al. .................. 707/5 |
| 6,122,636 A | * | 9/2000 | Malloy et al. ............... 707/102 |
| 6,205,447 B1 | * | 3/2001 | Malloy ........................ 707/102 |

OTHER PUBLICATIONS

Codd, et al., "Providing OLAP(On–Line analytical Processing) to User–Analysys: An IT Mandate," 1993.
Kimball, "The Date Warehouse Toolkit," John Wiley & Sons, Inc., ©1996, pp. 1–19.
Mattison, "Data Warehousing and Date Mining for Telecommunications," Artech House, ©1997, pp. 211–227.

* cited by examiner

*Primary Examiner*—Jean R. Homere
(74) *Attorney, Agent, or Firm*—Cooley Godward LLP (57) ABSTRACT

A method executed by a computer under the control of a program includes the step of establishing a compound structure in the form of a virtual unit of multi-dimensional storage. The compound structure includes a rack with a horizontal arrangement of target structures linked by an alias backbone representing a dimension of information. The horizontal arrangement of target structures selectively includes further compound structures and base structures containing data, in any combination. The compound structure is referenced to obtain information. The method is particularly useful in On-Line Analytical Processing (OLAP).

28 Claims, 7 Drawing Sheets

APPARATUS AND METHOD FOR COMPOUND ON-LINE ANALYTICAL PROCESSING IN DATABASES

This application is a continuation application of application Ser. No. 09/087,680, filed May 29, 1998 now U.S. Pat. No. 6,289,352.

BRIEF DESCRIPTION OF THE INVENTION

This invention relates generally to computer databases. More particularly, this invention relates to a technique for organizing data in databases using compound structures and On-Line Analytical Processing.

BACKGROUND OF THE INVENTION

On-Line Analytical Processing (OLAP) generally refers to a technique of providing fast analysis of shared multi-dimensional information stored in a database. OLAP systems provide a multi-dimensional conceptual view of data, including full support for hierarchies and multiple hierarchies. This framework is used because it is the most logical way to analyze businesses and organizations.

Unfortunately, it is difficult to handle large volumes of multi-dimensional information in a computer. The first problem is one of size. While small volumes of multi-dimensional data can be handled in Random Access Memory (RAM), this technique does not work for large problems. Multi-dimensional information is typically very large. Because OLAP is used for interactive analysis, it must respond very rapidly to queries, even when the data volumes grow.

The second problem is that multi-dimensional data is almost always sparse. In fact, in large multi-dimensional applications, it is not unusual to have only one cell populated for every million cells that are defined.

The sparsity problem discourages the storage of data in simple, uncompressed arrays, except in certain special cases. The simplest way of dealing with sparse data might seem to be to store only cells containing data in some indexed form. However, this approach has two problems. First, the index and keys are likely to take much more space than the data. Moreover, it is relatively time consuming to search them. Second, access will be inefficient because multi-dimensional data is often clustered, consisting of regions of relatively dense data separated by large, extremely sparse or totally empty sections. As a result, related data cells are unlikely to be placed physically close to each other.

A typical prior art approach to these problems is to break the data into smaller, denser multi-dimensional objects. Some techniques do this implicitly, presenting all the data to the user in what is known as a "hyper-cube" format in which all the data in the application appears to be in a single multi-dimensional structure. Other techniques do it explicitly in what is known as the "multi-cube" approach, in which the multi-dimensional database consists of a number of separate objects, usually with different dimensions. That is, the database is segmented into a set of multi-dimensional structures, each of which is composed of a subset of the overall number of dimensions in the database. Each segmented structure might be, for example, a set of variables or accounts, each dimensioned by just the dimensions that apply to that variable. It is also possible to identify two main types of multi-cubes. Block multi-cubes use orthogonal dimensions so there are no special dimensions at the data level. A cube may consist of any number of the defined dimensions, and both measures and time are treated as ordinary dimensions, just like any other. Series multi-cubes treat each variable as a separate cube (often a time series), with its own set of distinct dimensions.

In general, multi-cubes are more versatile, but hyper-cubes are easier to understand. End-users relate better to hyper-cubes because of their higher level view. Multi-cubes provide greater tunability and flexibility. In addition, multi-cubes are a more efficient way of storing very sparse data.

It would be highly desirable to develop an OLAP technique that combines the conceptual benefits of hyper-cubes with the processing benefits (e.g., versatility, tunability, and flexibility) of multi-cubes.

SUMMARY OF THE INVENTION

A method executed by a computer under the control of a program includes the step of establishing a compound structure in the form of a virtual unit of multi-dimensional storage. The compound structure includes a rack with a horizontal arrangement of target structures linked by an alias backbone representing a dimension of information. The horizontal arrangement of target structures selectively includes further compound structures and base structures containing data, in any combination. The compound structure may also include a stack with a vertical arrangement of racks linked by the alias backbone. The top level rack of the stack has read and write functionality, while the bottom level of the stack has read-only functionality. The compound structure is referenced to obtain information.

The invention provides the benefits of both multi-cubes and hyper-cubes. That is, the invention allows versatile, tunable, flexible and space efficient multi-cubes to be joined together into a compound structure that can be easily comprehended and manipulated by application developers and end users. The invention allows the underlying design of the structures to be changed without disturbing the view of the data which is accessed at the higher level. Another advantage of this architecture is that it provides a completely scalable and adaptable infrastructure. The complete scalability arises from the freedom to divide a multi-dimensional problem into manageable base structures, and then to efficiently process those structures in series or in parallel. That is, the processing of the base structures can be spread over many processors, either inside a single multi-processor system or across a loosely clustered network of machines. Because each of the underlying physical structures can be accessed and manipulated independently, it is possible for each of them to be sent to a different CPU for processing before recombination through the compound structure.

Another advantage of this architecture is that compound structures act as high level indices into the underlying data, which in turn relieves some of the pressure on the indices inside the target structures and gives improved performance. In general, the better management of sparsity and more logical organization of the multi-dimensional storage possible with the invention leads to improved performance.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
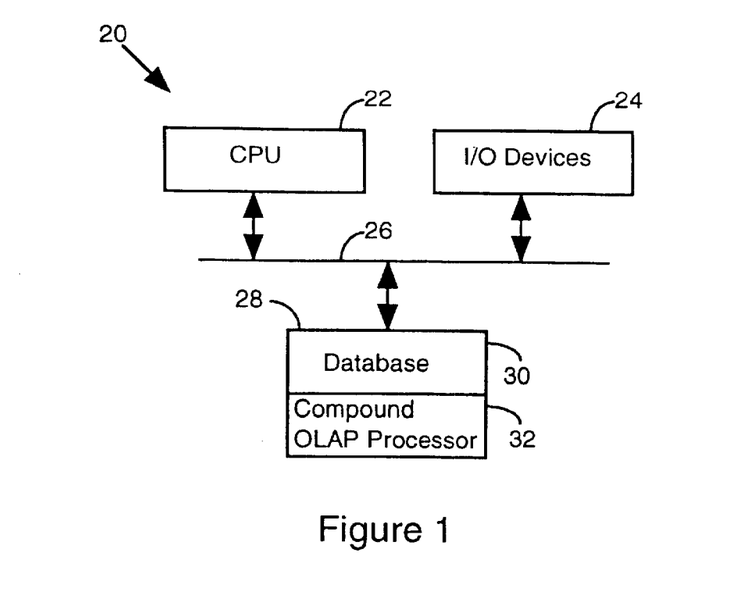
FIG. 1 illustrates a single computer constructed in accordance with an embodiment of the invention.

FIG. 1 illustrates a computer 20 constructed in accordance with an embodiment of the invention. The computer 20 includes a Central Processing Unit (CPU) 22 that communicates with a set of input/output devices 24 over a system bus 26. The input/output devices 24 include a keyboard, mouse, video monitor, printer, etc. The CPU 22 is also connected to a memory (primary and/or secondary) 28 via the bus 26. The interactions between CPUs 22, input/output devices 24, system buses 26, and memories 28 are known in the art. The present invention is directed toward the operation of these components in connection with a database 30 stored in memory 28 and a compound On-Line Analytical Processor (OLAP) 32 stored in memory 28. The database 30 is constructed and manipulated using the compound OLAP processor 32.

Figure 2:
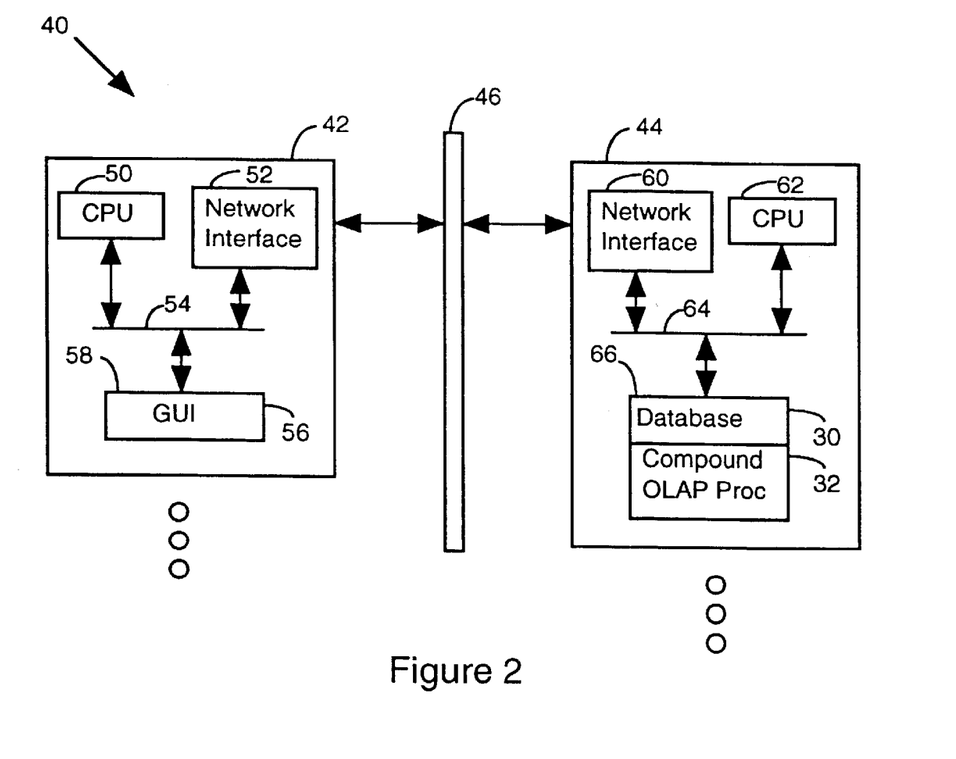
FIG. 2 illustrates a client/server computer network constructed in accordance with an embodiment of the invention.

FIG. 2 illustrates a client/server computer network 40 constructed in accordance with an embodiment of the invention. The network 40 includes a client computer 42 that communicates with a server computer 44 over a network channel 46. The network 40 may include a large number of client computers 42 and server computers 44.

Each client computer 40 includes a CPU 50 and network interface circuit 52, which communicate over a system bus 54. The client computer 50 also includes a graphical user interface 56 stored in memory 58. As known in the art, the graphical user interface 56 runs in conjunction with the CPU 50 to allow a user to select queries and view results of the queries.

Each server computer 44 includes a network interface circuit 60 and a CPU 62 that communicate over a system bus 64. The server computer 44 also includes a memory 66, which stores the database 30 and the compound OLAP processor 32. Queries from the client computer 42 to the server computer 42 are processed by the OLAP processor 32 and database 30, with the results being passed back to the client computer 42.

Possible architectures in which the database 30 and compound OLAP processor 32 of the invention may operate have now been described. Attention presently turns to a discussion of the particular processing executed by the compound OLAP processor 32 of the invention.

The database 30 stores and the OLAP processor 32 manipulates novel data structures constructed in accordance with the invention. In particular, the invention utilizes a compound structure. A compound structure is a virtual unit of multi-dimensional storage which ultimately points to real data. The compound structure is implemented with a multi-structure alias. A multi-structure alias is a language element that defines the configuration of a compound structure and thereby causes it to be built. In the prior art, an alias is typically associated with a sub-set of information from a single source. The present invention establishes a multi-structure alias describing a set of target structures. In other words, a target structure of the invention is a hierarchical subset of a compound structure. A target structure may be a compound structure itself or a base structure. A base structure is a multi-dimensional storage unit that exists as physical data (e.g., data in RAM-based storage, or data in Disk-based storage).

The target descriptions may also include calculated values from the target structures. Each target structure can be specified and manipulated separately. Thus, the multi-structure alias used by the compound structure of the invention provides functionality that is analogous to prior art multi-cubes.

There are a number of benefits associated with the compound structure of the invention. First, there is no upper limit on the amount of data that can be manipulated and viewed in a single compound structure. As discussed below, a single compound structure may include a nesting of other compound structures.

Next, one can execute fully-parallel consolidations and calculations across multiple target structures. In addition, a brand new mechanism for multi-dimensional transaction control is supported. Compound structures enable unlimited data volumes to be addressed via a single structure object, while retaining the flexibility to populate, calculate, or consolidate the target structures independently, and possibly in parallel.

As discussed above, the invention produces a compound structure with a multi-structure alias. The compound structure includes a "rack" with a horizontal arrangement of target structures linked by an alias backbone representing a dimension of information. The compound structure may also include a "stack" with a vertical arrangement of racks linked by the alias backbone. The top level rack of the stack has read and write functionality, while the bottom level rack of the stack has read-only functionality.

Observe that the compound structure is based on several other structures. The compound structure contains no data itself, but points to parts of the target structures, which may be of different types. A single compound structure of the invention can contain all available data and calculated results. It is not feasible to implement such a structure at the physical level. That is, processor and memory limitations prohibit the required physical combination of all data associated with the compound structure. Therefore, the data of the invention is combined in a manner that is analogous to the use of "Joins" in a relational database. That is, the rack and stack features of the compound structure operate as a type of join operator as used in a relational database.

The invention does not limit the type of rack and stack configurations that may be used. Therefore, there is great flexibility in achieving tailored characteristics for a given application. For example, certain elements in a rack may be stored in primary storage (i.e., RAM-based memory), other elements may be stored in secondary storage (i.e., disk-based memory), and others may be stored in remote external databases, either relational or OLAP. This ability to combine different elements in different relationships is novel. Another novel feature of the invention is that a compound structure can contain other compound structures, repeated to any required depth.

Figure 3:
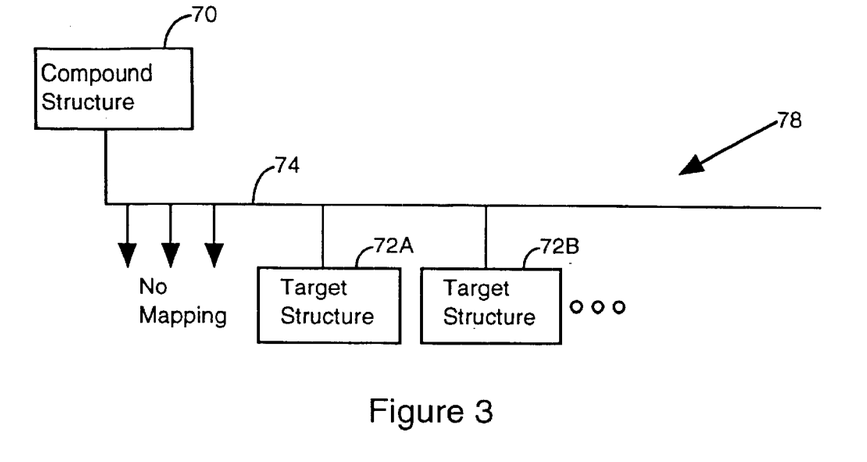
FIG. 3 illustrates a compound structure and associated backbone forming a "rack" in accordance with an-embodiment of the invention.

The features and benefits of the invention are more fully appreciated with reference to some examples. FIG. 3 illustrates a compound structure 70 associated with a set of target structures 72A–72N via an alias backbone 74. The target structures 72A–72N associated with the alias backbone 74 constitute a rack 78.

The compound structure 70 of FIG. 3 includes a first dimension that is the alias backbone 74. Computer code syntax to implement the structure of FIG. 3 needs to account for each alias field on the alias backbone 74. A series of STRUCTURE sub-blocks having the following general form may be used:

[TOP] STRUCTURE structure_or_tuple [ON d1.field_list|BY NAME]
mappings for d2 to dn
END STRUCTURE The ON clause provides an association by field position, within the given field list. The BY NAME clause (which is the default) provides an association by field name. The FOR keyword will be accepted as synonymous with ON. The implications of having a single backbone for the joining is that each target structure must have a number of dimensions greater than or equal to that in the parent alias, minus one. That is, ndim_target>=dim_alias−1 (in the absence of a REPEAT clause).

The structure_or_tuple clause must evaluate to a 0-D or 1-D tuple. As discussed below, a tuple is used by the compound OLAP processor as both a data-locator and a data-iterator. It provides a field specification for every dimension in the structure object. The structure_or_tuple clause may assess a scalar or a vector quantity. A structure name on its own is handled identically to a tuple in the form of struct_name{}. For instance:

| | | |
|---|---|---|
| strl ON dl.fl | | !Same as strl { } |
| struct{a1,b1,c1} | ON d1.f2 | !0-D tuple |
| struct{a1,b1:b10} | FOR d1.f1:fl0 | !1-D tuple |

Figure 4:
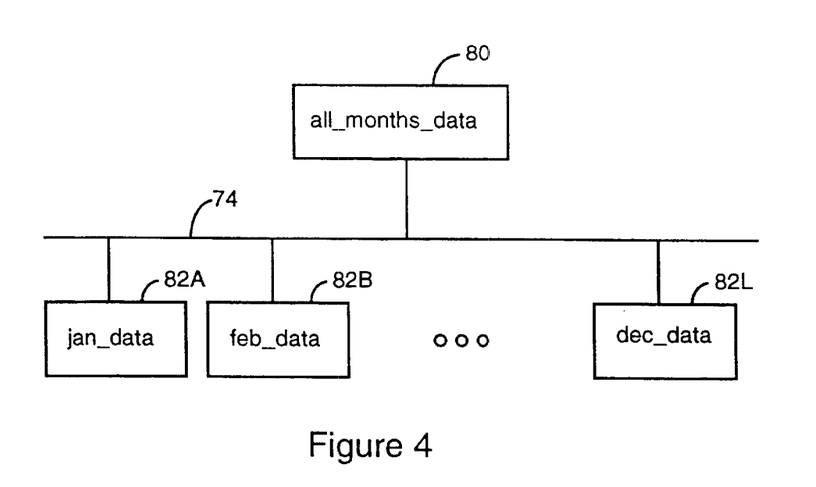
FIG. 4 illustrates a compound structure in accordance with an embodiment of the invention.

If ON is specified with more than a single field, or BY NAME is specified, then a target backbone is required. If the tuple is 1-D then its effective field list becomes the target backbone. If the tuple is 0-D then its structure must contain the same dimension as the alias backbone. Under these circumstances, the target backbone will either be the field list specified using any ON clause, a single field from the alias backbone if specified explicitly in the tuple, or the whole of the backbone dimension. Each of the structure blocks define a mapping for one or more backbone fields to a target structure. Note that a "NO DIMENSION" clause is actually the same as specifying the associated target field, or tuple operator, in the tuple described above. For example, the following are equivalent:

STRUCTURE str{a1,SUM b.*,c1:c10} ON d1.f1:f10
END STRUCTURE
and
STRUCTURE str{c1:c10} ON d1.f1:f10
 NO DIMENSION=a1
 NO DIMENSION=SUM b.*
END STRUCTURE The racking concept is more fully appreciated with reference to FIG. 4. Consider a structure with the dimensions time_months, products, region and items, which is used to hold a year's worth of data. It might make sense to store the data for each month in a separate three dimensional structure (with the dimensions product, region and items). In accordance with the invention, the time_months dimension is left out, as it will form the alias backbone for the compound structure. In this case, one defines separate structures with the names jan_data, feb_data, mar_data, etc.

FIG. 4 illustrates a compound structure all_months_data 80, which does not hold any data. An alias backbone 74 links this structure to twelve compound structures 82A–82L. Observe that the alias backbone 74 operates as a dimension of information (time_months). The target descriptions 82A–82L on the alias backbone 74 are referred to as three dimensional because they include information on products, region, and items.

The compound structure all_months_data behaves like a single structure containing the dimensions time_months, products, regions, and items. The structure of FIG. 4 may be implemented with the following code:

ALIAS STRUCTURE all_months_data
 AS MULTI STRUCTURE time_months, products, regions, items
 STRUCTURE jan_data FOR Jan
 END STRUCTURE
 STRUCTURE feb_data FOR Feb
 END STRUCTURE
 STRUCTURE mar_data FOR Mar
 END STRUCTURE
 . . .
END ALIAS Expanding on the example of FIG. 4, consider the case where the data for each month is broken into four product structures, as shown with blocks 84A–84D in FIG. 5. In this case, there are tiers of compound structures. The jan_data structure 82A provides a view on the underlying product structures for January; it does not contain any data itself, and therefore, does not contain the January consolidated data. If a total is required for the products, then it can be calculated "on-the-fly" using a SUM operator.

Figure 6:
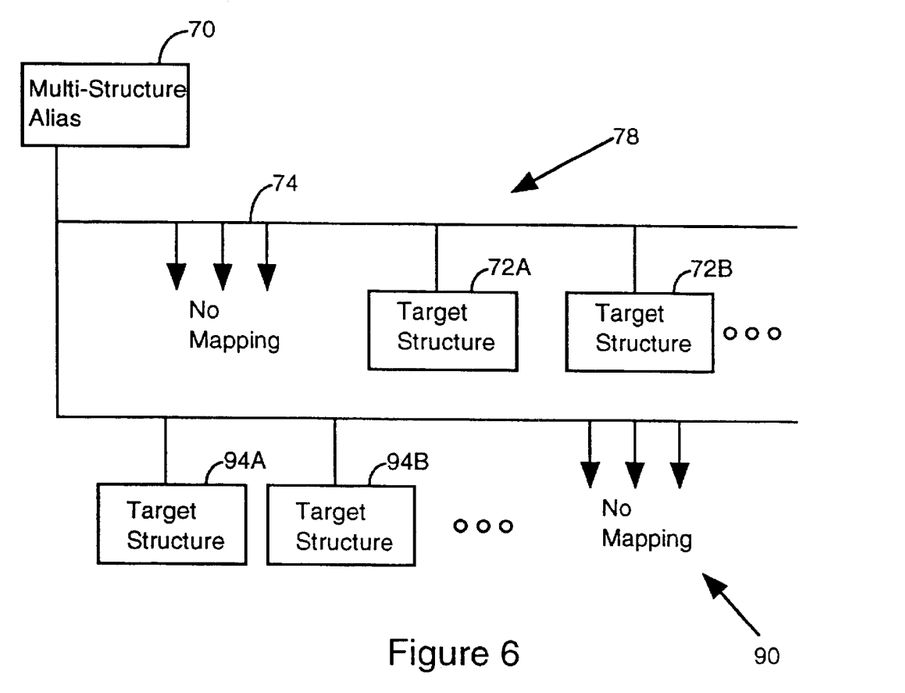
FIG. 6 illustrates a "rack" and "stack" compound structure in accordance with an embodiment of the invention.

FIG. 6 illustrates that the rack 78 may be supplemented with a second rack 90 to form a stack. The target structures do not have to be vertically aligned; the two racks 78 and 90 are completely independent. The second rack 90 may be characterized by the following code:

BOTTOM STRUCTURE structure_or_tuple [ON d1.fieldlist|BY NAME]
mappings for d2 to dn
END STRUCTURE In accordance with the invention, all modify-style access, such as assignments, cell creations, and cell deletions will only affect the top rack 78. Only read-style access, e.g. reading a cell value, testing for uninitialized values and deleted cells, etc., will use both racks 78, 90. When reading a cell, for instance, the corresponding cell in the appropriate structure on the top rack is first read. If this is not present, then the corresponding cell in the appropriate structure on the bottom rack is read. This operation is transparent to the system user.

Figure 7:
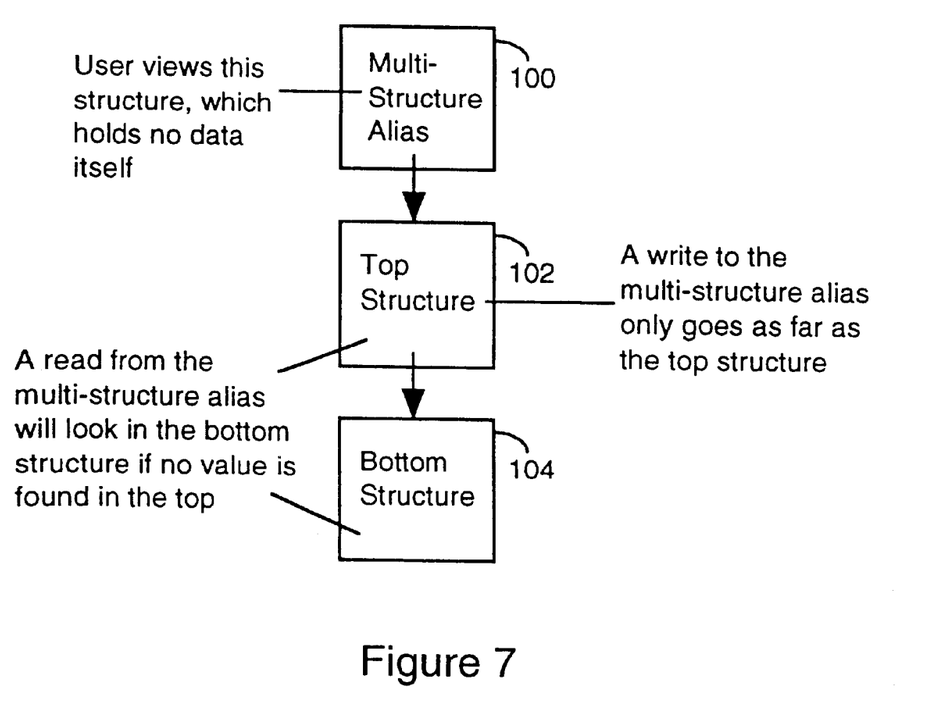
FIG. 7 illustrates the read/write functionality of a "rack" and "stack" compound structure of the invention.

To demonstrate this stacking concept, consider a system where the user has access to a structure into which he or she needs to write updated values. As part of the process of constructing the updates, a number of "what-ifs" are run. When a suitable set of values is generated, these are to be permanently reflected in the main data. In the prior art, this requires code to keep track of the changed data and update the main structure. The new compound structure architecture of the invention eliminates this requirement. Consider two structures: main_data (the structure holding the main data) and temp_data (a memory structure, initially defined with no data cells), both dimensioned by product, region and item. The user could be given access to the data through the following compound structure:
ALIAS STRUCTURE what_the_user_sees_str
   AS MULTI STRUCTURE product, region, item
   TOP STRUCTURE temp_data
   END STRUCTURE
   BOTTOM STRUCTURE main_data
   END STRUCTURE
END ALIAS This compound structure behaves in the following way. When a cell is required from the structure, the TOP structure is queried and if there is a value in the cell then the value is returned. If no value is found in the TOP structure, then the bottom structure is queried. When a cell is written to, the value is written only to the TOP structure, never the BOTTOM structure. FIG. 7 illustrates this concept.

When the user first sees the compound structure, he or she will see only the data in the BOTTOM structure, as the TOP one is completely empty. When the user writes to the compound structure, the new values sit in the TOP structure and obscure the ones below them in the BOTTOM structure, so he or she sees the effect of the updates.

If all the cells in the TOP structure are deleted, then the compound structure will revert to the view in the BOTTOM structure (essentially "rolling back" the transaction). If the cells in the TOP structure are pushed through to the BOTTOM structure, then essentially, the transaction is "committed". This dramatically reduces the amount of application code required to implement the system.

The full syntax for a compound structure looks like this:
ALIAS STRUCTURE [class] name [<attributes>]
   AS MULTI STRUCTURE dim1, dim2, . . .
      [TOP|BOTTOM] STRUCTURE structure_or_tuple &
      [[REPEAT] {ON|FOR} target_field_list|BY NAME]
         DIMENSION alias_dim [without_clause]=target_field_list
         DIMENSION alias_dim [without_clause]= DIMENSION target_dim
         DIMENSION alias_dim [without_clause]=REPEAT
         NO DIMENSION=single_target_field
         NO DIMENSION=tuple_operator target_field_list
      END [STRUCTURE]
END [ALIAS]
where the without_clause is one of:
WITHOUT [(] alias_field_list [)]
WITHOUT AUTO
The "class" term may be one of NUMBER, TEXT, or DATE.

The following discussion examines some specific cases of the syntax for the STRUCTURE block, and indicates what the expected functionality should be. The statement STRUCTURE structure ON fld associates the specified target structure with a given field on the alias backbone dimension. If the target structure contains the alias backbone dimension, then this effectively becomes the target backbone too. The statement STRUCTURE structure ON fldlist associates the specified target structure with a selection of fields from the alias backbone. The implication is that the alias backbone dimension is also present in the target structure. Hence, only the specified fields from the target structure will be mapped.

The statement STRUCTURE structure [BY NAME] implies that the alias backbone is also present in the target structure, and that they should be completely aligned (i.e. all fields mapped). The statement STRUCTURE {tuple} ON fld associates the given 0-D tuple with a specific alias field on the backbone dimension. If the target structure contains the alias backbone dimension, then this effectively becomes the target backbone too. A warning is reported if the tuple is not 0-D. For the statement STRUCTURE {tuple} ON fldlist, if the tuple is 1-D then its backbone is aligned with the specified selection of alias fields. The fields are matched sequentially. If the tuple is 0-D then the alias backbone dimension must be present in the target, and the specified fields are aligned. This is similar to something like: DIMENSION a_bbone [WITHOUT a_excess]=t_bbone.t_fldlist for non-backbone dimensions.

The expression STRUCTURE {tuple} [BY NAME] indicates that if the tuple is 1-D, then its target backbone is aligned with the similarly named fields on the alias backbone. This is similar to:
DIMENSION a_bbone [WITHOUT a_excess]= DIMENSION t_bbone
for non-backbone dimensions, except that the matching is target-to-alias rather than alias-to-target. If the tuple is 0-D then it implies the alias backbone dimension must also be present in the target, and the two should be completely aligned.

Those skilled in the art will appreciate that stacking allows consolidated cells to be separated from base cells, and placed elsewhere. Consider a disk-based structure and a RAM-based structure, of identical dimensionality, with the RAM-based structure stacked on top of the disk-based structure. Initially the disk-based structure has only base data in it and the RAM-based structure is empty. The result of a consolidate command on the resulting alias would leave all the base data in the disk-based structure and all of the derived values in the RAM-based structure. The consolidate command executes the calculations implied by hierarchies in the dimensions.

FIGS. 3 and 6 illustrate unmapped fields 76. Unmapped fields are alias fields that are omitted from the mapping process. These are identified by the WITHOUT clause defined above. Any cells accessed via these fields are also "unmapped". For a multi-structure alias, if no mapping is defined for one of the fields on the alias backbone, then all cells accessed via that field are similarly unmapped. Unmapped fields have a particularly important use in the context of compound structures. If two or more structures are joined with different sized dimensions, then the corresponding alias dimension can be made as large as the greatest target dimension, while selected alias fields are left unmapped when there is no correspondence for a given target.

A common issue with maintaining constantly changing data is that if a structure is updated in stages (an obvious example being the addition of data at the end of each month), then the performance could degrade as time goes on. This is because the data organization becomes disrupted each time data is added, and therefore affects the efficiency of the hashing and "data localization".

Figure 5:
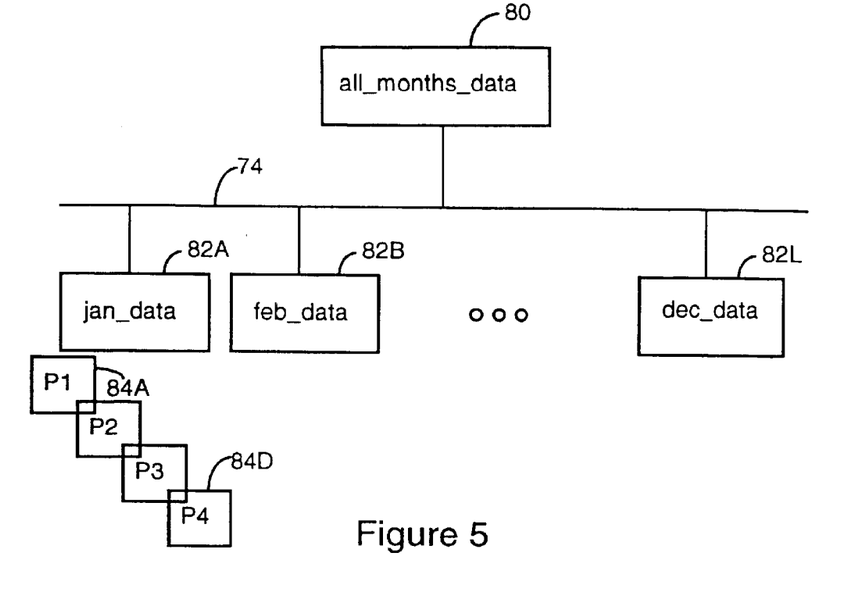
FIG. 5 illustrates the creation of a compound structure in the context of the architecture of FIG. 4.

The compound structure solution to this is shown in FIG. 5, where each of the months can be treated as an independent structure, and therefore if the new data only belongs to March, then only mar_data needs to be updated. If a number of months are being updated together, they are loaded through the compound structure (as it appears like any other structure, it can be the target of a load operation), but it may well be more efficient to deal with each of the target structures individually. The load operation imports data from some external source, such as a relational database. Observe here that the compound structure is treated exactly the same as the underlying "real" structures.

One of the problems with splitting data into a number of structures is that new fields may be added to the dimensions as time goes by. Consider the example in FIG. 4. Suppose that when adding data for February, new products need to be added. One possibility would be to recompose jan_data to have space for these products. This recomposition could mean creating a new structure and copying all the data over, which would rather lessen the benefits of the incremental data loading described above.

Fortunately, compound structures provide a better solution. As the two structures jan_data and feb_data have different products in them, two product dimensions are required, say products_jan and products_feb. As the products_feb will be the most up-to-date, then it can be used in all_months_data. A compound structure can now be produced using:

ALIAS STRUCTURE all_months_data
    AS MULTI STRUCTURE time_months, products_feb, regions, items
    STRUCTURE jan_data FOR Jan
        DIMENSION products_feb=DIMENSION products_jan
    END STRUCTURE
    STRUCTURE feb_data FOR Feb
    END STRUCTURE
END ALIAS The DIMENSION statement in the STRUCTURE block for jan_data performs a field mapping as part of the ALIAS definition; all the fields in products_feb are matched, by name, with the fields from products_jan. As there are fields in products_feb which do not appear in products_jan, some mappings are not possible, and in these cases the compound OLAP processor will leave that field unmapped. This means that any references to the new products in the January data will appear as missing cells. Furthermore, they are a type of missing cell that can never be created (i.e. unmapped cells).

The invention has been disclosed with examples wherein each field in the backbone dimension has been represented in a different structure. This need not be the case. For example, consider the dimension:

DIMENSION half_year_dim
    jan
    feb
    mar
    apr
    may
    jun
    qtr1=SUM jan:mar
    qtr2=SUM apr:jun
    half_year
END DIMENSION This information can be stored as monthly, quarterly and half-year data in three separate structures monthly_data, quarterly_data, and half_year_data. The first two of these will need their own time dimensions:

DIMENSION months_dim
    jan
    feb
    mar
    apr
    may
    jun
END DIMENSION
DIMENSION quarters_dim
    qtr1
    qtr2
END DIMENSION But as the half-year structure would only have a one-field time dimension, this dimension can be omitted. Now these three structures can be combined into a compound structure called half_year_data using the following code:

ALIAS STRUCTURE half_year_data
    AS MULTI STRUCTURE half_year_dim, [other dimensions]
    STRUCTURE monthly_data{months_dim.*} FOR & half_year_dim.Jan:Mar; Apr:Jun
    END STRUCTURE
    STRUCTURE quarterly_data{quarters_dim.*} FOR half_year_dim.qtr1;qtr2
    END STRUCTURE
    STRUCTURE half_yearly_data FOR half_year_dim.half_year
    END STRUCTURE
END ALIAS Observe that the monthly and quarterly structures contain a dimension which contributes more than one field on the alias backbone dimension (i.e. along their time dimensions). These dimensions are called the target backbone dimensions. Although the above example had all the fields for each structure together (i.e. adjacent) in the backbone dimension, this is not necessary. The compound structure above would work just as well with the half_year_dim definition as follows:

DIMENSION half_year_dim
    jan
    feb
    mar
    qtr1=SUM jan:mar
    apr
    may
    jun
    qtr2=SUM apr:jun
    half_year
END DIMENSION In the previous example the consolidated information was actually stored in the structures half_yearly_data and quarterly_data. The compound structure also provides some on-the-fly consolidation possibilities. Consider the following alias.

ALIAS STRUCTURE half_year_data
    AS MULTI STRUCTURE half_year_dim, [other dimensions]
    STRUCTURE monthly_data{months_dim.*} FOR half_year_dim.jan:jun
    END STRUCTURE
    STRUCTURE monthly_data{SUM months_dim.jan:mar} FOR half_year_dim.qtr1
    END STRUCTURE
    STRUCTURE monthly_data{SUM months_dim.apr:jun} FOR half_year_dim.qtr2

END STRUCTURE
STRUCTURE monthly_data{SUM months_dim.jan:jun} FOR &
half_year_dim.half_year
END STRUCTURE
END ALIAS This example uses the fact that a compound structure can map fields to tuples containing operators (e.g. SUM) at the same time as tuples without operators. Such data cells are calculated whenever they are accessed, and no data is actually stored for them, thus reducing the size of data files. A consequence of these figures being calculated on-the-fly, rather than pre-calculated and stored, is that they are automatically protected; you cannot modify such consolidated figures.

The invention's ability to exploit parallel processing can be appreciated with reference to FIG. 4. In accordance with the invention, the target structures (jan_data,feb_data, etc.) can be used as independent structures in their own right. Thus, the process of calculating the data which appears through the compound structure all_months_data breaks down into the independent calculation of the twelve target structures. This lends itself well to parallel processing on all varieties of parallel hardware, including loosely clustered independent processors. Thus, the performance afforded by the invention is extremely scalable. Even if there is only a single processor available, the independent nature of the target structures can be used to allow them to be processed one after the other, which will dramatically reduce memory requirements for calculation and consolidation.

One of the most common design decisions in any multi-dimensional environment is whether to have time represented by one or two dimensions. For example if a structure is to hold monthly data over two years then time can be represented as two dimensions:

DIMENSION month_dim
  jan
  feb
  mar
  apr
  may
  jun
  jul
  aug
  sep
  oct
  nov
  dec
  all_year=SUM jan:dec
END DIMENSION
  DIMENSION YEAR_dim
  y1 "Year 2"
  y2 "Year 1"
END DIMENSION Time can also be represented in one dimension:
DIMENSION two_years
  'y1 Jan'|'y1 Feb'|'y1 Mar'|'y1 Apr'|'y1 May'|'y1 Jun'
  'y1 Jul'|'y1 Aug'|'y1 Sep'|'y1 Oct'|'y1 Nov'|'y1 Dec'
  'y1 total'=SUM 'y1 Jan': 'y1 Dec'
  'y2 Jan'|'y2 Feb'|'y2 Mar'|'y2 Apr'|'y2 May'|'y2 Jun'
  'y2 Jul'|'y2 Aug'|'y2 Sep'|'y2 Oct'|'y2 Nov'|'y2 Dec'
  'y2 total'=SUM 'y2 Jan': 'y2 Dec'
END DIMENSION The former is more suitable for year-on-year comparison and the latter for long term trend analysis. A decision for one or the other usually has to be made at an early stage and this inevitably means application workarounds later. However, the compound structure architecture of the invention provides the ideal solution. If year_on_year_str is dimensioned by years_dim and months_dim from above, along with a product and a region dimension, consider the following alias.

ALIAS STRUCTURE trend_str
  AS MULTI STRUCTURE two_years, product, region
    STRUCTURE year_on_year_str{year_dim.y1, month_dim.jan:all_year}&
    FOR 'y1 jan':'y1 total'
    END STRUCTURE
    STRUCTURE year_on_year_str{year_dim.y2, month_dim.jan:all_year)&
    FOR 'y2 Jan':'y2 total'
    END STRUCTURE
END ALIAS What this does is to cut up the structure into two yearly slices and then glue them back together, end-to-end, to provide a trend view of the same data. This results in the two required views of the data with only one set of data actually being stored.

A tuple is used by the compound OLAP processor 32 as both a data-locator and a data-iterator. It basically provides a field specification for every dimension in the structure object. Each specification may be one of:

fixed a single explicit dimension field;
list a list of several dimension fields;
operator a list of fields to be acted on by a tuple operator (one of: SUM, AVG, MIN, MAX, or COUNT); or
external inherit a single field from an externally-defined iteration context (e.g. a LOOP)

Figure 8:
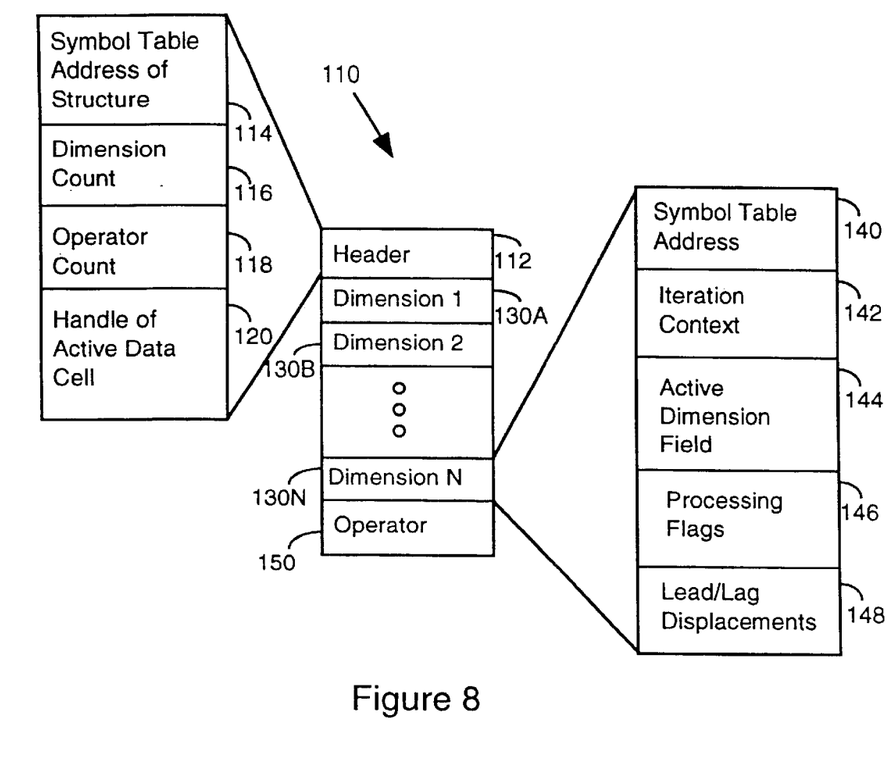
FIG. 8 illustrates a tuple block in accordance with an embodiment of the invention.

FIG. 8 illustrates a tuple control block 110 used in an embodiment of the invention. The tuple control block 110 contains a fixed-length header 112 containing information about the structure and tuple as a whole (e.g., the symbol table address of the structure 114, the number of dimension entries 116, the number of operators applied 118, and a handle for the active data cell 120). This is followed by an entry for each dimension 130A–130N in the structure. Each dimension entry contains a symbol table address 140, an iteration context 142, an active dimension field 144, processing flags 146, and lead/lag displacements 148. The processing flags 146 classify the field specification as belonging to one of the four groups above (i.e., fixed, list, operator, or external). Each dimension entry has an active (or current) dimension field, and the intersection of these in the structure object determines the active data cell handle stored in the tuple header. The dimension entry for a TIME dimension may also have a lead/lag displacement 148 specified. This allows prior and future fields to be specified relative to the current field, e.g. for a "carry forwards" operation.

The tuple control block 110 can be used as a data-locator by inserting specific field references and asking to find the associated cell. It can also be used as a data-iterator. If it describes a set of more than one data cell, then it can be made to visit each such cell, either in a defined order or an optimized order.

If the tuple contains operators 150 then it actually describes a virtual structure containing calculated values (calculated on demand rather than stored anywhere). Each operator has a separate operator entry at the end of the tuple control block, and these are evaluated in-order. A compiler applies certain axioms to the operators to allow some re-ordering if this will result in a more optimal iteration order, but without affecting the resulting values. An optimal iteration order is one that makes most effective use of the data cache, and is determined by the same "localization" and "lifetime" issues as a normal virtual memory management system.

Note that these operators, which are based on the Structured Query Language (SQL) "column operators", generate calculated results which have no underlying data cells. Hence they are never stored anywhere. These are fundamentally different from dimension fields which are defined in terms of other fields via a formula. These latter calculated results may be pre-stored or produced on demand. If produced on demand then they may be cached for repeated access. The on-demand results which aren't cached also do not have any underlying data cells. However, these are an intrinsic part of the dimension's definition, and any structures composed from that dimension; the tuple-operator calculations can be applied ad hoc to any structure object, and do not require special fields to be defined.

As previously indicated, a compound structure is a virtual structure that encompasses a selection of cells from one or more other structures (including other aliases), and/or a selection of calculated values from those structures. The total entity of an alias and all the target structures it references, right down to the base structures, is the previously discussed compound structure.

Figure 9:
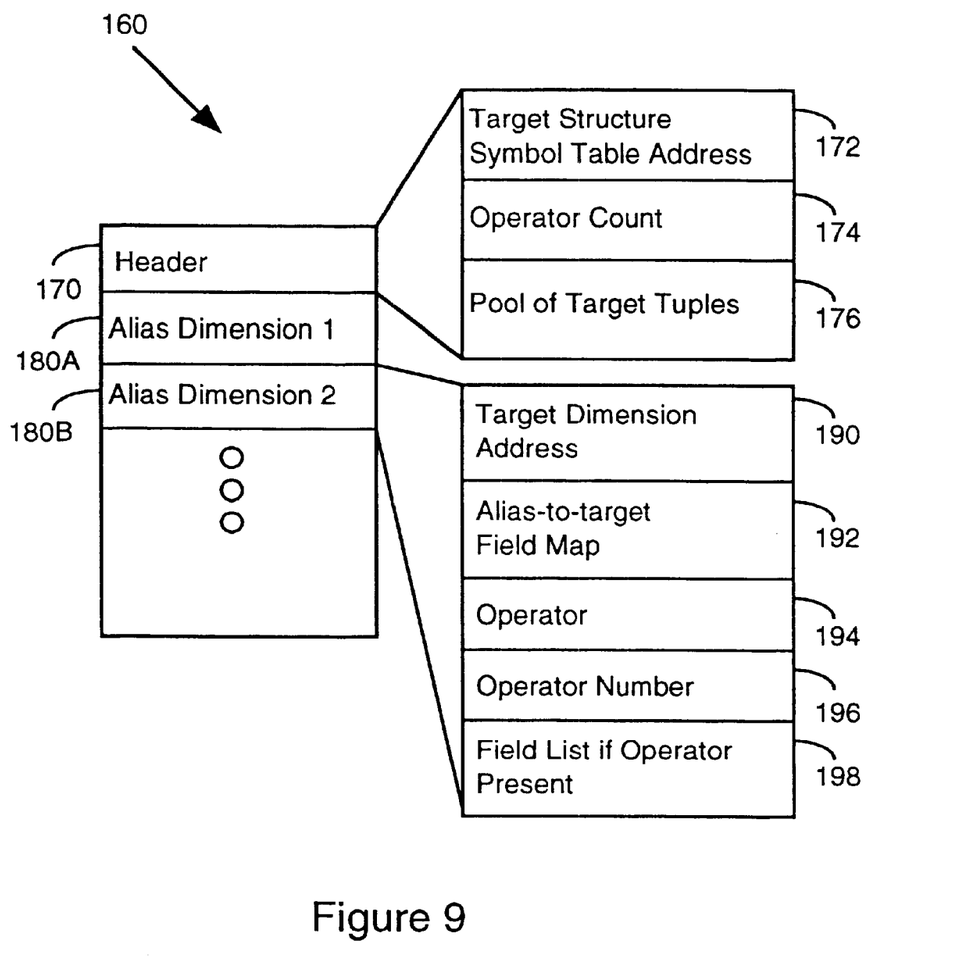
FIG. 9 illustrates an alias descriptor in accordance with an embodiment of the invention.

The definition of a structure alias allows each target to be specified separately, and assigned to specific fields on the top or bottom racks. Each target description is compiled into an internal control block called an alias descriptor. FIG. 9 illustrates an alias descriptor in accordance with an embodiment of the invention. The alias descriptor block is responsible for mapping all field combinations in the parent alias (at a given point on the alias backbone) to an equivalent field combination in the corresponding target. The alias descriptor 160 includes a header 170, which specifies a target structure symbol table address 172, an operator count 174, and a pool of target tuples 176. The alias descriptor 160 also includes a set of alias dimension entries 180A–180N. Each alias dimension entry includes a target dimension address 190, an alias-to-target field map 192, an operator 194, an operator number (i.e., evaluation order) 196, and a field list 198 if the operator is present.

Figure 10:
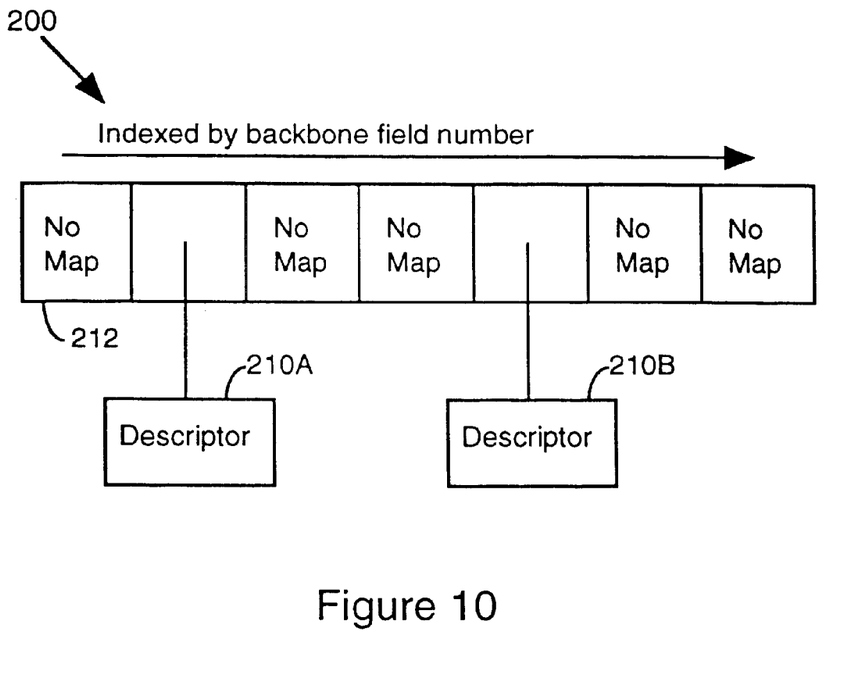
FIG. 10 illustrates a vector of descriptors in accordance with an embodiment of the invention.

If the backbone has more than one distinct field mapping then a vector of alias descriptors 200 is constructed, as shown in FIG. 10. The vector 200 includes target descriptions 210A, 210B and unmapped entries 212. Each descriptor is indexed by the field number on the backbone, otherwise only a single descriptor is created. This also happens independently for the bottom rack. Only one copy of each alias descriptor is created. If this is to be associated with more than one backbone field then the first corresponding vector entry is the one that "owns" that descriptor, and the remaining entries merely have duplicate pointers (distinguished by setting the low bit of the address). A vector entry of 0 indicates that no data was mapped for that backbone field.

When an alias tuple is required to locate a specific cell in a compound structure, the first field number in the tuple (i.e. that of the backbone dimension) is first used as an index into the top rack. This will identify an alias descriptor relevant to that backbone field (or will find a zero if there was nothing mapped there). This alias descriptor contains enough information to construct a target tuple (including any tuple operators) from the remaining fields in the alias tuple. The alias fields are converted, using the field maps, to equivalent target fields and then inserted into this target tuple. The target tuple is then used to locate the associated target cell, or calculate a target value if operators are involved. If there is no such target cell, and the operation being performed on the compound structure is read-orientated, then a similar set of actions is performed on the bottom rack.

This processing may be represented by the following pseudo-code. This same algorithm may be applied to either the top or bottom racks, as described later.

Use backbone field number as index to locate alias descriptor
IF Vector of descriptors has a zero at this offset THEN
   target cell (and target structure) doesn't exist
ELSE
   Form a target tuple
   IF alias descriptor specifies tuple operators THEN
      Insert the tuple operator details into the target tuple
      Map the remaining alias fields to target fields
      Calculate a target value
   ELSE
      Map the remaining alias fields to target fields
      Locate the associated target data cell
   END IF
END IF This operation is always performed first on the top rack. If the result of this operation either finds a data cell or calculates a target value, then this is used in the context of the current operation (e.g. cell-read, cell-modification, etc.). If no cell or value was determined, and the current operation is read-orientated (e.g. cell-read, cell-test, etc.) then the same operation is performed on the bottom rack, and the results used in the current operation. This is described in more detail below.

Note that the backbone field acts as an extra level index during the cell access. This has the effect of lessening the burden on the inherent index associated with each target structure and contributes to the overall performance. Note too that details of any tuple operators in the alias descriptor are never related to any of the alias dimensions or fields; they relate to superfluous target dimensions that may have to be eliminated to make the dimensionality of the mapping valid. A result of this is that the tuple operator details can be simply inserted directly into the target tuple, before or after the mapping of the remaining alias fields.

This is essentially what happens during a cell access. However, such processing would take too long on each access since target tuples would be continuously created and destroyed. What the processor 32 does, therefore, is to pre-create a small pool of target tuples 176 when the ALIAS block is compiled, and attach them to their relevant alias descriptors. These target tuples will be specific to each alias-descriptor, and will already have details of the relevant target structure, and any fixed fields or tuple operators not affected by the parent alias dimensions inserted into them.

During a cell access, the compound OLAP processor 32 "commissions" a target tuple from this pool, rather than creating a fresh one from scratch, and then "decommissions" it back to the pool when it has finished. Each alias descriptor is the permanent owner of these target-tuple resources, and the list may be grown dynamically if the demand for them increases. Preferably, optimizations are used to avoid repeated commissioning/decommissioning if the same alias descriptor is being referenced consecutively. This may be summarized as follows:

Use backbone field number as index to locate alias descriptor
IF Vector of descriptors has a zero at this offset THEN
   target cell (and structure) doesn't exist
ELSE
   IF this is the first alias descriptor accessed via this tuple THEN
      commission a target tuple from the descriptor
   ELSE IF alias descriptor is different from the last one accessed THEN
      decommission the previous target tuple (to its alias descriptor)
      commission a new one from the current alias descriptor
   END IF
   Map the remaining alias fields to target fields
   IF alias descriptor specifies tuple operators THEN
      Calculate a target value
   ELSE
      Locate the associated target data cell
   END IF
END IF In this pseudo-code, the commissioning process embodies a dynamic growing of the target-tuple pool if the demands exceed the available number of tuples. The above pseudo-code indicates how the invention identifies a target structure, and target cell, from either the top rack or bottom rack. The following pseudo-code indicates how these two racks are used together to implement the "stacking" feature of compound structures:

Read Access
   This includes all read-only access to the compound structure, either for reading the cell value (e.g. for reporting, calculation, etc.) or for reading the cell status (e.g. testing whether the cell exists, testing whether it is initialized with a value, etc.)
   Locate alias descriptor from top rack
   IF no descriptor found THEN
      Cell doesn't exist there
   ELSE
      Fashion a target tuple
      IF tuple contains operators THEN
         Evaluate the tuple
         Return (calculated value)
      ELSE
         Locate relevant target data cell
      END IF
   END IF
   IF no target cell identified yet THEN
      Locate alias descriptor from bottom rack
      IF no descriptor found THEN
         Cell doesn't exist there
      ELSE
         Fashion a target tuple
         IF tuple contains operators THEN
            Evaluate the tuple
            Return (calculated value)
         ELSE
            Locate relevant target data cell
         END IF
      END IF
   END IF
   IF no target cell identified yet THEN
      Return (INVALID NaN)
   ELSE
      Return (cell details)
   END IF Write Access
   This includes all write-only access to the compound structure, either for modifying the cell value (e.g. assigning a new value to a cell, making a cell uninitialized), or creating a deleting cells within the structure.
   Locate alias descriptor from top rack
   IF no descriptor found THEN
      Generate error (neither cell nor target structure exists here)
   ELSE
      Fashion a target tuple
      IF tuple contains operators THEN
         Generate error (can't write to a calculated value)
      ELSE
         Locate relevant target data cell
      END IF
   END IF Note that the bottom rack is not interrogated here. Also, note that if no target structure is mapped for the current backbone field, then no cell can ever be created there.

In the "write access" case, the way in which the details of the target data cell are manipulated depends on the operation being performed, as follows:

Assigning a New Value
   IF cell doesn't exist THEN
      IF cell-creation enabled THEN
         Create a new data cell for this target field combination
         Assign the cell value
      ELSE
         Generate an error (writing to non-existent data cell)
      END IF
   ELSE
      Modify the cell with the new value
   END IF Creating a Cell
   IF cell doesn't exist THEN
      IF cell-creation enabled THEN
         Create a new data cell for this target field combination
      END IF
   END IF Deleting a Cell
   IF cell does exist THEN
      IF cell-deletion enabled THEN
         Delete the data cell at this target field combination
      END IF
   END IF The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method executed by a computer under the control of a program, said method comprising the steps of:
    providing a view of a compound structure in the form of a virtual unit of multi-dimensional storage, said compound structure including a rack with a horizontal arrangement of target structures linked by an alias backbone representing a dimension of information, wherein said horizontal arrangement of target structures includes at least one nested compound structure, said compound structure referencing data in physical memory without combining said data in physical memory in the manner represented in said view; and
    referring to said compound structure to obtain information associated therewith.

2. The method of claim 1 wherein said providing includes establishing a compound structure with a stack defining a vertical arrangement of racks linked by said alias backbone.

3. The method of claim 2 wherein said providing includes establishing a top level rack wherein said target structures have read and write functionality.

4. The method of claim 2 wherein said providing includes establishing a bottom level rack wherein said target structures have read-only functionality.

5. The method of claim 1 further comprising using said alias backbone as an index during said referring.

6. The method of claim 1 wherein providing includes providing a horizontal arrangement of target structures including at least one compound structure and a base structure.

7. The method of claim 6 wherein providing includes providing a base structure of multi-dimensional storage.

8. A method executed by a computer under the control of a program, said method comprising the steps of:
    providing a view of a compound structure in the form of a virtual unit of multi-dimensional storage, said compound structure including a rack with a horizontal arrangement of target structures linked by an alias backbone representing a dimension of information, wherein said horizontal arrangement of target structures includes at least one nested compound structure, said virtual unit of multi-dimensional storage representing said compound structure as a combination of target structures that does not exist in physical memory in the manner in which said view of said compound structure is represented in said virtual unit of multi-dimensional storage; and
    referencing said compound structure to obtain information associated therewith.

9. The method of claim 8 wherein said providing includes establishing a compound structure with a stack defining a vertical arrangement of racks linked by said alias backbone.

10. The method of claim 9 wherein said providing includes establishing a top level rack wherein said target structures have read and write functionality.

11. The method of claim 9 wherein said providing includes establishing a bottom level rack wherein said target structures have read-only functionality.

12. The method of claim 8 further comprising using said alias backbone as an index during said referencing.

13. The method of claim 8 wherein providing includes providing a horizontal arrangement of target structures including at least one compound structure and a base structure.

14. The method of claim 13 wherein providing includes providing a base structure of multi-dimensional storage.

15. A computer readable memory to direct a computer to function in a specified manner, comprising:
    executable instructions to provide a view of a compound structure in the form of a virtual unit of multi-dimensional storage, said compound structure including a rack with a horizontal arrangement of target structures linked by an alias backbone representing a dimension of information, wherein said horizontal arrangement of target structures includes at least one nested compound structure, said compound structure referencing data in physical memory without combining said data in physical memory in the manner represented in said view; and
    executable instructions to refer to said compound structure to obtain information associated therewith.

16. The computer readable memory of claim 15 further including executable instructions to establish a compound structure with a stack defining a vertical arrangement of racks linked by said alias backbone.

17. The computer readable memory of claim 16 further including executable instructions to establish a top level rack wherein said target structures have read and write functionality.

18. The computer readable memory of claim 16 further including executable instructions to establish a bottom level rack wherein said target structures have read-only functionality.

19. The computer readable memory of claim 15 further comprising executable instructions to use said alias backbone as an index.

20. The computer readable memory of claim 15 further comprising executable instructions to establish a horizontal arrangement of target structures including at least one compound structure and a base structure.

21. The computer readable memory of claim 20 further comprising executable instructions to establish a base structure of multi-dimensional storage.

22. A computer readable memory to direct a computer to function in a specified manner, comprising:
    executable instructions to provide a view of a compound structure in the form of a virtual unit of multi-dimensional storage, said compound structure including a rack with a horizontal arrangement of target structures linked by an alias backbone representing a dimension of information, wherein said horizontal arrangement of target structures includes at least one nested compound structure, said virtual unit of multi-dimensional storage representing said compound structure as a combination of target structures that does not exist in physical memory in the manner in which said view of said compound structure is represented in said virtual unit of multi-dimensional storage; and
    executable instructions to reference said compound structure to obtain information associated therewith.

23. The computer readable memory of claim 22 further including executable instructions to establish a compound structure with a stack defining a vertical arrangement of racks linked by said alias backbone.

24. The computer readable memory of claim 23 further including executable instructions to establish a top level rack wherein said target structures have read and write functionality.

25. The computer readable memory of claim 23 further including executable instructions to establish a bottom level rack wherein said target structures have read-only functionality.

26. The computer readable memory of claim 22 further including executable instructions to use said alias backbone as an index.

27. The computer readable memory of claim 22 further comprising executable instructions to establish a horizontal arrangement of target structures including at least one compound structure and a base structure.

28. The computer readable memory of claim 27 further comprising executable instructions to establish a base structure of multi-dimensional storage.

* * * * *